(12) United States Patent
Song

(10) Patent No.: US 11,248,274 B2
(45) Date of Patent: Feb. 15, 2022

(54) POLYSACCHARIDE AND/OR POLYPEPTIDE BASED GRAFT POLYMERS AS SYNTHETIC TANNINS

(75) Inventor: Ma Song, Yorkshire (GB)

(73) Assignee: Lanxess Deutschland GmbH, Cologne (DE)

( * ) Notice: Subject to any disclaimer, the term of this patent is extended or adjusted under 35 U.S.C. 154(b) by 419 days.

(21) Appl. No.: 14/122,746

(22) PCT Filed: May 25, 2012

(86) PCT No.: PCT/EP2012/059825
§ 371 (c)(1),
(2), (4) Date: Feb. 26, 2014

(87) PCT Pub. No.: WO2012/163823
PCT Pub. Date: Dec. 6, 2012

(65) Prior Publication Data
US 2014/0182064 A1   Jul. 3, 2014

(30) Foreign Application Priority Data

Jun. 2, 2011  (GB) ...................................... 1109270
Jul. 15, 2011 (EP) ...................................... 11174207

(51) Int. Cl.
| | |
|---|---|
| C14C 3/22 | (2006.01) |
| C08F 251/00 | (2006.01) |
| C08F 289/00 | (2006.01) |
| C14C 3/08 | (2006.01) |
| C08F 251/02 | (2006.01) |
| C08F 291/12 | (2006.01) |

(52) U.S. Cl.
CPC .............. *C14C 3/22* (2013.01); *C08F 251/00* (2013.01); *C08F 251/02* (2013.01); *C08F 289/00* (2013.01); *C08F 291/12* (2013.01); *C14C 3/08* (2013.01)

(58) Field of Classification Search
CPC . C14C 3/08; C14C 3/22; C08F 251/00; C08F 251/02; C08F 289/00; C08F 291/12
See application file for complete search history.

(56) References Cited

U.S. PATENT DOCUMENTS

| | | | |
|---|---|---|---|
| 4,009,996 A | | 3/1977 | Wuermli |
| 4,314,800 A | * | 2/1982 | Monsheimer et al. ...... 8/94.1 R |
| 5,425,784 A | * | 6/1995 | Denzinger et al. ............ 8/94.33 |
| 5,714,560 A | * | 2/1998 | Denzinger et al. ........... 527/201 |
| 5,760,154 A | | 6/1998 | Krause et al. |
| 5,783,616 A | | 7/1998 | Krause et al. |
| 5,854,321 A | | 12/1998 | Krause et al. |
| 2005/0155157 A1 | | 7/2005 | Kensicher et al. |
| 2008/0229511 A1 | * | 9/2008 | Rajendran et al. ............ 8/94.33 |
| 2009/0221748 A1 | | 9/2009 | Coca et al. |
| 2010/0017972 A1 | | 1/2010 | Sartore et al. |

FOREIGN PATENT DOCUMENTS

| | | |
|---|---|---|
| CN | 1847276 A | 10/2006 |
| CN | 101177717 A | 5/2008 |
| CN | 101575652 A | 11/2009 |
| DE | 19951018620 | 5/1995 |

OTHER PUBLICATIONS

European Search Report from European Application No. 14186158, dated Jan. 22, 2015, 3 pages.
European Search Report from European Application No. 11174207, dated Feb. 20, 2012, 3 pages.

* cited by examiner

*Primary Examiner* — Amina S Khan
(74) *Attorney, Agent, or Firm* — Volpe Koenig

(57) ABSTRACT

A graft polymer of polysaccharides or polypeptides or its respective derivatives, obtainable by free radical polymerization of A) a monomer selected from or a monomer mixture of (a) from 20 to 100% by weight of acrylic acid or methacrylic acid or of a mixture thereof or of the alkali metal, alkaline earth metal or ammonium salts thereof, (b) from 0 to 80% by weight of other monoethylenically unsaturated monomers which are copolymerizable with the monomers (a) and (c) from 0 to 5% by weight of monomers having at least 2 ethylenically unsaturated, nonconjugated double bonds in the molecule, in the presence of either B1) polysaccharides, oxidatively, hydrolytically or enzymatically degraded polysaccharides, oxidized hydrolytically degraded or oxidized enzymatically degraded polysaccharides, or such chemically modified degraded products, chemically modified mono-, oligo-or poly-saccharides or mixtures of the stated compounds and/or B2) polypeptides, their hydrolysates or enzymaticallydegraded and optionally chemically modified products or mixtures of the stated compounds in a weight ratio A: (B1 or B2) of from 1:99 to 18:82 or in a weight ratio A:(B1+B2) of from 60:40 to 1:99 and B1:B2 of from 97:3 to 3:97 used as tanning agents.

13 Claims, No Drawings

POLYSACCHARIDE AND/OR POLYPEPTIDE BASED GRAFT POLYMERS AS SYNTHETIC TANNINS

The present invention relates to special polysaccharide and/or polypeptide based graft polymers, a process for its preparation and its use as synthetic tannins for leather.

In the modern leather industry, one key success story was the application of synthetic tannins. Since its invention during the 1940s, synthetic tannins have evolved with the development of science and technology to satisfy the requirements of leather making, ensuring leather is still one of the most preferred materials for applications such as: shoes, clothing and fancy goods as well certain industrial procedures. The synthetic tannins are capable of improving mechanical properties of leather, modify the aesthetic properties of leather and help to achieve the desired colouring properties.

The conventional synthetic tannins are generally based on aryl compounds-formaldehyde condensates, amino-compound-formaldehyde condensates or the combination of them. Most commonly used aryl compounds are phenol and its derivatives (phenol sulphonic acid, sulphone) and naphthalene. Amino compounds normally are urea, dicyandiamide or melamine. It has been widely accepted that formaldehyde is toxic to human as well as environment. Aryl compounds, especially phenol are toxic, corrosive and very slow to biodegrade.

Viable commercial alternatives to the traditional synthetic tannins in leather industry (or similar products used in textile industry) therefore are vital to the sustainable development of these industries. The obvious replacements are the vegetable tannins as synthetic tannins were developed to replace them. The vegetable tannins are extracted from certain types of hard wood therefore have limited supply and also vegetable tannins lack some of very important technical properties of the synthetic tannins.

Many other synthetic polymers have also been applied in the leather processing. Polymer or copolymer based on acrylic acid, methacrylic acid, maleic acid or anhydride, their esters, vinyl acetate and other unsaturated compounds have been used in leather processing. The copolymer of styrene-maleic acid (amide, salts or esters), styrene-butadiene (and its maleic adduction products), short chain polyester, short chain polyimide, polyurethane and other water dispersible polymers have also been found useful for certain leather processing applications. However all these products were used in complementary of traditional synthetic tannins, rather than replacing them.

A typical synthetic tanning making process was disclosed by U.S. Pat. No. 4,009,996. It teaches us that synthetic tannin can be produced by reacting phenol sulphonic acid, urea, sulphone and formaldehyde in a desired order.

In order to reduce the phenolic based syntans some efforts have already been done in the art. As such in U.S. Pat. No. 5,425,784 graft co-polymers of saccharides with acrylics were found. With an amount of at least 20% by weight of acrylic monomers exemplified about more than 40% by weight.

Although phenolic free these copolymers still have some drawbacks, in particular the surface dyeing shade, fullness, softness and grain tightening when used as tanning or retanning agents.

Similar graft polymers on the basis of proteins as core and acrylic monomers lead to similar results and disclosed in U.S. Pat. No. 5,714,560. In particular also here the surface dyeing shade, fullness, softness and grain tightening are still properties to be further improved.

Very similar WO94/01476 refers to graft polymers on the basis of sugars and acrylic monomers, still with an amount of sugar limited to 60% by weight of the graft polymer. In US2005/0155157 the grafted polymers on the basis of proteins and acrylic monomers are also limited to 40% by weight of protein, whereby the copolymers are used for finishing after the retanning step (see [0069]) rather than for tanning or retanning.

In U.S. Pat. No. 5,760,154 the polysaccharide based graft polymers are made with acrylic monomers and olefinic sulphonic acid monomers for several purposes, i.a. for retanning of leather. However, as highlighted in their Example 29, such products performed even poorer than standard commercial acrylic product during the retanning application. In addition the amount of polysaccharide is limited to 60% based on the sum of total monomers and core. As shown in the comparison example of the present invention such high amounts in favour of the acrylics show some drawbacks.

In the U.S. Pat. No. 5,783,616, which is similar to the U.S. Pat. No. 5,425,784 in the sense both of them are the sugar-acrylics grafting, their example 33 showed that their example product produce leather less full and the grain less tight than commercial acrylics when used in retanning. In addition the amount of sugar is limited to 60% based on the sum of total monomers and core. As shown in the comparison example of the present invention such high amounts in favour of the acrylics show some drawbacks.

Other starch or polysaccharide based graft polymers are known from CN-A-1847276 having a minimum amount of acrylic monomers of at least 45% by weight, or CN-A-101575652. The latter requires more than 20% by weight of acrylic monomers. As shown in the comparison example of the present invention such high amounts in favour of the acrylics show some drawbacks.

In WO2008/075279 proteic hydrolysates are linked with acrylic segments via polyethylene glycol spacers and are used as tanning agents.

For coating purposes in US-A2009/221748 graft co-polymers with acrylic monomers are disclosed that have a core in an amount of less than 10% by weight.

Further graft co-polymers are known from GB2137654 as tanning agents wherein the protein or polysaccharide core is used in a ratio to the monomers from 1:30 to 1:5. As shown in the comparison example of the present invention such high amounts in favour of the acrylics show some drawbacks.

In CN101177717 a blend of hydrolysed starch with polyvinyl alcohol and polyvinyl acetate, which is crosslinked, is disclosed as tanning agents. As polyvinyl acetate and polyvinyl alcohol have been both shown to make leather hard and papery in general, they are considered to be not a appropriate basis to start with in order to resolve the problem of the present invention.

In US-A-2008/0229511 a graft copolymer on the basis of protein hydrolysate (less than about 5% in the whole system in the examples) and polysaccharide and acrylates is disclosed as synthetic tanning agents. Quite high acrylic monomers (greater 70% by weight in the examples) are used. As shown in the comparison example of the present invention such high amounts in favour of the acrylics show drawbacks such as surface dyeing shade, graining tightening and "plastic handle" of leather at higher offers.

The stated prior art agents have a number of disadvantages. In particular, they lighten the color of the leathers and skins thus produced to an excessive extent. Moreover, they lead to poor lightfastness and heat resistance. They may also impart an undesirable rubber-like handle to the leather as well as the drawbacks mentions above.

It is an object of the present invention to provide the leather industry with tanning agents for leather and skin production which no longer have the stated disadvantages.

We have found that this object is achieved by a graft polymer of polysaccharides or polypeptides or its respective derivatives, obtainable by free radical polymerization of
A) a monomer selected from or a monomer mixture of
  (a) from 20 to 100% by weight of acrylic acid or methacrylic acid or of a mixture thereof or of the alkali metal, alkaline earth metal or ammonium salts thereof,
  (b) from 0 to 80% by weight of other monoethylenically unsaturated monomers which are copolymerizable with the monomers (a) and
  (c) from 0 to 5% by weight of monomers having at least 2 ethylenically unsaturated, non-conjugated double bonds in the molecule,
  in the presence of either:
B 1) polysaccharides, oxidatively, hydrolytically or enzymatically degraded polysaccharides, oxidized hydrolytically degraded or oxidized enzymatically degraded polysaccharides, or such chemically modified degraded products chemically modified mono-, oligo-or polysaccharides or mixtures of the stated compounds
or
B2) polypeptides or hydrolytically degraded and optionally chemically modified polypeptides or mixtures of the stated compounds
in a weight ratio A:(B1 or B2) of from 1:99 to 18:82, preferably 2:98 to 10:90.

Preferable graft polymers according to the present invention are water soluble or water dispersible.

The preferred water-soluble graft polymers are obtainable by homo- or co-polymerisation of the monomers A in the presence of the natural substances B1 or B2.

Suitable monomers A if the group (a) are (meth)acrylic acid and the alkali metal, alkaline earth metal or ammonium salts thereof. Mixtures of these may also be used. These salts are obtainable, for example, form (meth)acrylic acid if the acid in aqueous solution is neutralized with sodium hydroxide solution, magnesium hydroxide solution ammonia, amines or alkaloamines. The monomers A of the group (a) may be subjected to the graft copolymerisation together with other monoethylenically unsaturated monomers (b) which are co-polymerizable with the monomers (a). The amount of monomers (a) in the monomer mixture is then from 20 to 100, preferably from 40 to 100, in particular 98 to 100, % by weight, while the monomers (b) may be present therein in an amount of up to 80, preferably up to 60, in particular up to 2, % by weight.

Examples of the monomers A of group (b) which are used in the graft polymerization include crotonic acid, maleic acid, maleic anhydride, fumaric acid, citraconic acid, citraconic anhydride, $C_1$-$C_8$-alkyl and hydroxyalkyl esters of acrylic acid, methacrylic acid or crotonic acid and mono-or di- $C_1$-$C_8$-alkyl or-hydroxyalkyl esters of maleic acid, fumaric acid or citraconic acid, eg. methyl acrylate, ethyl acrylate, n-butyl acrylate, methyl methacrylate, monomethyl maleate, dimethyl maleate, monoethyl maleate, diethyl maleate, β-hydroxyethyl acrylate, β- and γ-hydroxypropyl acrylate, δ-hydroxybutyl acrylate, β-hydroxyethyl methacrylate and β-and γ-hydroxypropyl methacrylate.

Amides and N-substituted alkylamides of the compounds stated under (a) are also suitable as monomers A of group (b), for example acrylamide, methacrylamide, N-alkyl (meth)acrylamides where the alkyl group is of 1 to 18 carbon atoms, such as N-methylacrylamide, N,N-dimethylacrylamide, N-tert-butylacrylamide, N-octadecylacryl amide, dimethylaminopropylmethacrylamide and acrylamidoglycolic acid. Other suitable monomers (b) are alkylaminoalkyl (meth)acrylates, eg. β-(dimethylamino)ethyl methacrylate, β-(dimethylamino)ethyl acrylate, β-(diethylamino)ethyl acrylate, δ-(diethylamino)propyl acrylate and δ-(diethylamino)propyl methacrylate.

Other suitable monomers of group (b) are sulfo-containing monomers, for example vinylsulfonic acid, allylsulfonic acid, methallylsulfonic acid, styrene-sulfonic acids, 3-sulfopropyl acrylate, 3-sulfopropyl methacrylate and aciylamidopropanesulfonic acid, as well as monomers containing phosphonic acid groups, for example vinylphosphonic acid, allylphosphonic acid and aciylamidomethylpropanephosphonic acid.

This group (b) of monomers A also includes N-vinylpyrrolidone, N-vinylcaprolactam, N-vinylformamide, N-vinyl-N-methylformamide, 1-vinylimidazole, 1-vinyl-2-methylimidazole, vinyl acetate and vinyl propionate, acrylonitrile and methacrylonitrile, acrolein and methacrolein, crotonaldehyde and the acetals thereof.

Other suitable monomers A of group (b) are esters of alkoxylated $C_1$-$C_8$-alcohols, which have been reacted with from 2 to 50 mol of ethylene oxide, propylene oxide, butylene oxide or a mixture thereof, with the monoethylenically unsaturated carboxylic acids of group (a), for example the esters of acrylic acid or methacrylic acid with a $C_{13/15}$-alcohol which has been reacted with different amounts of ethylene oxide, for example 3, 5, 7, 10 or 30 mol of ethylene oxide.

Vinylaromatics, such as styrene and a-methyl-styrene, as well as $C_1$-$C_{12}$-olefins, eg. ethylene, propylene, 1-butene, 2-butene or butadiene, are also suitable as monomers A of group (b).

Other suitable monomers A of group (b) are N-mono-and N,N-disubstituted amides of monoethylenically unsaturated $C_3$-$C_8$-carboxylic acids, the amide nitrogen carrying, as substituents, polyoxyalkylated $C_2$-$C_{28}$-alkanols, in particular $C_2$-$C_{18}$-alkanols, which have been reacted with from 2 to 100, in particular from 3 to 20, mol of ethylene oxide, propylene oxide and/or butylene oxide. Examples of such compounds are $H_2C=CH-CO-NH-CH_2CH_2-O-(C_2H_4O)_n-H$, $H_2C=CH-CO-N[CH_2CH_2O-(C_2H_4O)_n-H]_2$, $H_2C=C(CH_3)-CO-NH-(CH_2)_4-O-(C_2H_4O)_n-H$, $H_2C=C(CH_3)-CO-NH-C_2H_4O-(C_3H_6)_n-H$ and $H_2C=CH-CO-NH-(CH_2)_{18}-O-(C_2H_4O)_n-H$ (n=3 to 20).

The basic monomers are preferably used in the form of the salts with mineral acids, eg. hydrochloric acid, sulfuric acid or nitric acid, or in quaternized form. Suitable quaternizing agents are, for example, dimethyl sulfate, diethyl sulfate, methyl chloride, ethyl chloride and benzyl chloride. The carboxylic acids are preferably used in the form of the free acids and as alkali metal, alkaline earth metal or ammonium salts or as mixtures thereof.

Components (b) of monomer mixture A which are preferably used for the preparation of the graft polymers are crotonic acid, maleic acid, maleic anhydride, fumaric acid, citraconic acid, citraconic anhydride, $C_1$-$C_8$-alkyl, in particular $C_1$-$C_4$-alkyl, or hydroxyalkyl esters of acrylic acid or methactrylic acid or crotonic acid, mono-or di- $C_1$-$C_8$-alkyl, in particular $C_1$-$C_4$-alkyl or- hydroxyalkyl esters of maleic acid, fumaric acid or citraconic acid, acrylamide, methaciylamide, methacrolein, acrylamidomethylpropanesulfonic acid, N-vinylimidazole or a mixture thereof.

The graft polymers may be further modified by carrying out the graft polymerization in the presence of monomers A of group (c). In this case, the monomer mixtures contain up to 5% by weight of a monomer having at least two ethylenically unsaturated, nonconjugated double bonds in the molecule. These compounds are usually used as crosslinking agents in co-polymerizations. They may be added to the monomers of group (a) which are used for the copolymerization or to the monomer mixtures of (a) and (b). Where they are employed, the preferably used amount of monomers (c) is from 0.05 to 2% by weight. The concomitant use of the monomers A of group (c) during the copolymerization results in an increase in the K values of the copolymers.

Suitable compounds (c) are, for example, methylenebisacrylamide, esters of acrylic acid and methacrylic acid with polyhydric alcohols, eg. glycol diacrylate, glyceryl triacrylate, ethylene glycol dimethacrylate, glyceryl trimethacrylate and polyols, such as pentaerythritol and glucose, which are at least diesterified with acrylic acid or methacrylic acid. Other suitable crosslinking agents are divinylbenzene, divinyldioxane, pentaerythritol triallyl ether and pentaallylsucrose. Water-soluble monomers, in particular ethylene glycol diacrylate or glycol diacrylates of polyethylene glycols having a molecular weight of up to 3,000, or a mixture thereof, are preferably used from this group of compounds.

In a preferred embodiment, for the preparation of the graft polymers, acrylic acid or the alklai metal, alkaline earth metal or ammonium salts thereof are used alone as monomer A, or a mixture of at least 80, in particular at least 98, % by weight of acrylic acid or the alkali metal, alkaline earth metal or ammonium salts thereof and the monomers (b) are used as monomer mixture A.

The polymerization of the monomers A is preferably carried out in the presence of natural substances based on compounds B1 or B2.

B1

Derivatives of the polysaccharides are considered to be oxidatively, hydrolytically or enzymatically degraded polysaccharides, oxidized hydrolytically degraded or oxidized enzymatically degraded polysaccharides or such chemically modified degraded products or chemically modified mono-, oligo-or polysaccharides.

Derivatives of the polypeptides are considered to be hydrolytically degraded or enymatically degraded and optionally chemically modified polypeptides.

From the economic point of view, starch, thermally and/or mechanically treated starch, oxidatively, hydrolytically or enzymatically degraded starches and chemically modified starches are preferably used as polysaccharides of component B1 in the graft polymerization. In particular, all starch is suitable. However, starches obtained from corn, wheat, rice and tapioca and in particular potato starches are preferred. The starches are virtually water-insoluble and can be converted into a water-soluble form in a known manner by thermal and/or mechanical treatment or by enzymatic or acid-catalyzed degradation. Other suitable components B1 are oxidatively degraded starches. Examples of starch degradation products which are obtainable by oxidative, hydrolytic or enzymatic degradation of starch are the following compounds: dextrins, such as white and yellow dextrins, maltodextrins, glucose syrups, maltose syrups, hydrolysis products having a high content of D-glucose, starch saccharification products and maltose and D-glucose and its isomerization product fructose.

Other suitable components B1 are oxidized starches, for example dialdehyde starch, and oxidized starch degradation products, such as gluconic acid, glucaric acid and glucuronic acid. Such compounds are obtained, for example, by oxidation of starch with periodate, chromic acid, hydrogen peroxide, nitrogen dioxide, nitrogen tetroxide, nitric acid or hypochlorite.

Further suitable components B I are chemically modified polysaccharides, in particular chemically modified starches, for example starches and starch degradation products which have been converted into esters with acids and into ethers with alcohols. The esterification of these substances is possible both with inorganic and with organic acids or their anhydrides or chlorides. In direct esterification, the liberated water leads to acid-catalyzed cleavage of glycosidic bonds. Of particular industrial interest are phosphated and acetylated starches and starch degradation products. The commonest method for etherifying starch is to treat the starch or the starch degradation products with organic halogen compounds, epoxides or sulfates in aqueous alkaline solution. Starch ethers are, for example, the alkyl ethers, hydroxyalkyl ethers, carboxyalkyl ethers and allyl ethers of starch. Chemically modified starches of component B1 are understood as including cationically modified starches, for example starches reacted with 2,3-epoxypropyltrimethylammonium chloride, as described in U.S. Pat. No. 3,649,616.

Chemically modified polysaccharides include, for example, carboxymethylcellulose, hydroxyethylcellulose, hydroxypropylcellulose, carboxymethylhydroxyethylcellulose, sulfoethylcellulose, carboxymethylsulfoethylcellulose, hydroxypropylsulfoethylcellulose, hydroxyethylsulfoethylcellulose, methylsulfoethylcellulose and ethylsulfoethylcellulose.

Other suitable components B1 are chemically modified degraded starches, for example hydrogenated products of starch hydrolysis products, such as sorbitol and mannitol, maltitol and hydrogenated glucose syrups or oxidized hydrolytically degraded or enzymatically degraded starches.

The products of the acid-catalyzed or enzymatic transglcosidation or glycosidation, for example methylglucoside, are also suitable.

Particularly preferred components B1 are hydrolytically degraded starches having a high content of monosaccharides and pure monosaccharides.

In a preferred embodiment the polysaccharide B1 has an average molecular weight from 500 to 10,000 Dalton, in particular from 3000 to 10000 Dalton, preferably 3000 to 8000 Dalton.

Very preferred polysaccharide B1 is an oxidatively, hydrolytically or enzymatically degraded polysaccharide, having an average molecular weight from 500 to 10,000 Dalton, in particular from 3000 to 10000 Dalton, preferably 3000 to 8000 Dalton, in particular hydrolytically degraded starch.

The particularly preferred polysaccharide B1 is the hydrolytically degraded starches from food crops such as potato or corn in particular with a wide molecular weight distribution. This can be achieved by blending different hydrolytically degraded starches.

B2

Preferred for this purpose are all proteins of which a proportion of at least 20% by weight dissolves in the polymerization medium under the polymerization conditions. Examples of suitable proteins are given in Ullmann Enzyklopadie der technischen Chemie, 4th Edition, Weinheim, 1980, Volume 19, pp. 491 to 557.

The polypeptides are renewable raw materials. They originate, for example, from skins, supporting and connecting tissue, bones and cartilage, for example collagen, elastin, gelatin, ossein and skin glue. Polypeptides from milk are dairy polypeptides, casein and lactalbumin. Wool, bristles, feathers and hairs give keratin. Also suitable are polypeptides from fish and eggs and from blood as abatoir waste, for example blood polypeptides, albumin, globulin, globin, fibrinogen and haemoglobin. Other suitable polypeptides originate from plants, such as corn, wheat, barley and oats, for example glutelin, prolamin, zein and bluten. In addition, polypeptides can be obtained from seed, for example from soybean, cottonseed, groundnuts, sunflowers, rape, coconuts, linseed, sesame, saflour, peas, beans and lentils. In addition, the polypeptide constituents of clover, alfalfa, grass, potatoes, cassava and yam may be used. Other polypeptide sources are bacteria, fungi, algae and yeasts, for example *Pseudomonas, Lactobacillus, Penicillium*, blue algae, green algae, *Chlorella, Spirulina* and surplus yeast.

Preferred polypeptides as component B2 for the preparation of the graft copolymers are collagen from skin and hide (natural or modified by tanning treatment), casein, gelatin, bone glue, polypeptides from soybeans, cereals, in particular wheat and corn, and peas. The polypeptides may be obtained from the natural raw materials by, for example, dissolution, grinding, screening and classification. In order to convert them into a preferred soluble form, it is in many cases necessary to carry out digestion by physical, chemical or enzymatic treatment, for example hydrolysis with acid or alkalis, fermentation with yeasts, bacteria or enzymes, extraction methods in order to remove minor constituents, coagulation from extracts by heating, addition of electrolyte, pH adjustment or addition of precipitants. Pure products can be prepared by, for example, fractional dissolution and precipitation or by dialysis.

Preferred polypetides B2) have an average molecular weight greater 1500 Dalton, in particular greater 3000 Dalton and is selected preferably from the group consisting of an animal polypeptide, vegetable polypeptide and their hydrolysates The particularly preferred B2) includes recycled leather waste by hydrolysation, protein extract from de-fatted oil seeds such as soya, milk protein and vegetable proteins from wheat or rice.

Process

For the preparation of the graft polymers, the monomers A are advantageously subjected to free radical polymerization in the presence of compounds of the saccharide component B1 or the protein component B2. In some cases, it may be advantageous for the action of the resulting graft polymer to use two or more of the compounds stated under B1 or two or more of the compounds stated under B2. With respect to B1 for example mixtures may be mentioned of starches degraded under acid catalysis or enzymatically and gluconic acid, mixtures of a monosaccharide and an oligosaccharide, mixtures of an enzymatically degraded starch and a monosaccharide or mixtures of glucose and sucrose or mannose. For B2 mixtures of leather waste hydrolysate and vegetable proteins from wheat or rice, the mixtures of bone glue and milk protein or the mixture of soya protein and feather hydrolysate may be mentioned.

The polymerization can be carried out in the presence or absence of inert solvents or inert diluents. Since the polymerization in the absence of inert solvents or diluents leads in some cases to non-uniform graft polymers, graft polymerization in an inert solvent or diluent is preferred. For example, those inert diluents in which the compounds stated under B1 or B2 can be suspended and which dissolve the monomers A are suitable. In these cases, the graft polymers are present in suspended form alter the polymerization and can readily be isolated in solid form by filtration.

Suitable inert diluants are, for example, toluene, o-, m- and p-xylene and isomer mixtures thereof, ethylbenzene, aliphatic hydrocarbons or gasoline fractions which contain no polymerizable monomers. Chlorohydrocarbons, such as chloroform, carbon tetrachloride, hexachloroethane, dichloroethane and tetrachloroethane, are also suitable.

In the procedure described above, in which the component B1 or B2 is suspended in an inert diluent, anhydrous compounds of component B1 or B2 are preferably employed, and anhydrides of dicarboxylic acids are preferably used from group (b) of the monomers A. A preferred method for the preparation of the graft polymers is solution polymerization, the polysaccharide component B1 or B2, the monomers A and the resulting graft copolymer being present at least in disperse form and in many cases in dissolved form. For example, inert solvents such as water, methanol, ethanol, isopropanol, n-propanol, n-butanol, sec-butanol, tetrahydrofuran, dioxane and mixtures thereof, are suitable for the solution polymerization.

The polymerization may be carried out continuously or batchwise. As stated above, components A and B1 or B2 may also be polymerized in the absence of inert diluents or solvents. Continuous polymerization at from 160 to 250° C. is particularly suitable for this purpose. If necessary, it is possible here to proceed in the absence of polymerization initiators. However, catalysts which form free radicals under the polymerization conditions, for example inorganic and organic peroxides, persulfates, azo compounds and redox catalysts, are preferably used here too.

The graft polymers described which are preferably water-soluble are generally prepared in the presence of free radical initiators. Preferred free radical initiators are all compounds which have a half life of less than 3 hours at the particular polymerization temperature chosen. If the polymerization is first initiated at a lower temperature and is completed at a higher temperature, it is advantageous to carry out the reaction with at least two initiators which decompose at different temperatures, i.e. first to use an initiator which decomposes at a lower temperature for initiating the polymerization and then to complete the main polymerization using an initiator which decomposes at a higher temperature. Water-soluble and water-insoluble initiators or mixtures of water-soluble and water-insoluble initiators may be used. The water-insoluble initiators are then soluble in the organic phase.

For the temperature 40 to 60° C. the following initiators may be advantageously used: Acetylcyclohexanesulfonylperoxide, diacetylperoxydicarbanate, dicyclohexylperoxydicarbonate, di-2-ethylhexylperoxydicarbonate, tert-butylpemeodecanoate, 2,2'-phenylpropionamidine)-dihydro-chloride, 2,2'-azobis(2-methylpropionamidine) dihydro-chloride.

For the temperature greater 60 to 80° C. the following initiators may be advantageously used: tert-Butyl perpivalate, dioctanoyl peroxide, dilauroyl peroxide, 2,2'-azobis(2, 4-, 5-dimethylvaleronitrile);

For the temperature greater 80 to 100° C. the following initiators may be advantageously used: Dibenzoyl peroxide, tert-butyl per-2-ethylhexanoate, tert-butyl permaleate, 2,2'-azobisisobutyronitrile, dimethyl 2,2'-azobisisobutyrate, sodium persulfate, potassium persulfate, ammonium persulfate;

For the temperature greater 100 to 120° C. the following initiators may be advantageously used: Bis(tert-butylperoxy) cyclohexane, tert-butyl peroxyisopropyl carbonate, tert-butyl peracetate, hydrogen peroxide;

For the temperature greater 120 to 140° C. the following initiators may be advantageously used:

2,2-Bis(tert-butylperoxy)butane, dicumyl peroxide, di-tert-amyl peroxide, di-tert 5-butylperoxide;

For the temperature greater 140° C. the following initiators may be advantageously used: p-menthane hydroperoxide, pinane hydroperoxide, cumene hydroperoxide and tert-butyl hydroperoxide.

If, in addition to the stated initiators, salts or complexes of heavy metals, for example copper, cobalt, manganese, iron, vanadium, cerium, nickel and chromium salts, or organic compounds, such as benzoin, dimethylaniline or ascorbic acid, are also used either alone as grafting agent or as auxiliary for free radical initiators. When used with free radical initiators the half lives of the stated free radical initiators can be reduced. For example, tert-butyl hydroperoxide can be activated with the addition of 5 ppm of copper(II) acetylacetonate so that polymerization can be effected at as low as 100° C. The reducing component of redox catalysts may also be formed by, for example, compounds such as sodium sulfite, sodium bisulfate, sodium formaldehyde sulfoxylate and hydrazine.

From 0.01 to 20, preferably from 0.05 to 15, % by weight, based on the monomers A used in the polymerization, of a polymerization initiator or of a mixture of a plurality of polymerization initiators, free radical initiators or heavy metal based grafting agents, are used. From 0.01 to 30% by weight of the reducing compounds are added as redox components, Heavy metals are used in an amount of from 0.1 to 100 ppm, preferably from 0.5 to 10 ppm. It is also advantageous to use a combination of peroxide, reducing agent and heavy metal as the redox catalyst.

The polymerization of the monomers A can also be carried out by the action of ultraviolet radiation, in the presence or absence of the UV initiators. For polymerization under the action of UV radiation, the conventional photoinitiators or sensitizers are used. These are, for example, compounds such as benzoin and benzoin ethers, α-methylbenzoin and α-phenylbenzoin. Triplet sensitizers, such as benzyl diketals, can also be used. The UV radiation sources in addition to high-energy UV lamps, such as carbon arc lamps, mercury vapor lamps or xenon lamps are, for example, low-UV light sources, such as fluorescent tubes having a high blue component.

The preferred process for the manufacturing of graft polymers according to the present invention wherein the component B1 or B2 is used as core, is by free radical induced co-polymerisation wherein the components of the monomers of A) are added to B 1) or B2) in an inert solvent at a temperature of 40 to 180° C. in the presence of a free radical-forming initiator, characterized in that at least 50% by weight, in particular more than 70% by weight of the radical-forming initiator are with the component B1) or B2) before the addition of the monomers A) and the rest is added together with the monomers of A) or thereafter.

Preferably the rest of the initiator is added to the reaction mixture together with monomers of A).

A polymerisation regulator can be used in the graft polymerisation process to regulate the side chain lengths as required. Any compound containing active hydrogen can be used as chain transferring agent. Example of suitable regulators are mercapto compounds, such as mercapto alcohols, mercapto acids or mercapto esters. Other suitable regulators including allyl alcohols, aldehydes, formic acid, amines or their salts. If needed from 0.05-10% by weight, based on the quantity of monomers A can be used.

The other grafting polymerisation conditions will follow the usual procedure for such process. The polymerisation system should be placed in an inert gas atmosphere in the absence of atmosphere oxygen. The water soluble phosphorus compound with an oxidation state 1-4 can be used to reduce the colour of resultant graft polymer while the temperature and product uniformity can be controlled by adequate mixing and limiting the addition speed of monomers mixture A.

As already stated, it is also possible to subject polysaccharides B1) in aqueous suspension to the graft polymerization. Preferably, however, graft polymers are prepared from polysaccharides by first converting a water-insoluble polysaccharide in aqueous Suspension with the addition of enzymes and/or acids into a water-soluble form and subjecting the resulting aqueous solution of the degraded polysaccharide to the graft polymerization. Here, a water-insoluble polysaccharide, for example potato starch, is first suspended in water and degraded. This degradation may be carried out under the action of enzymes, for example, α- or β-amylase, or of debranching enzymes, such as pullulanase, or by the action of inorganic or organic acids in a known manner. Examples of suitable inorganic acids are phosphoric acid, sulfuric acid, hydrochloric acid and nitric acid. Examples of suitable organic acids are saturated or unsaturated carboxylic acids, eg. formic acid, acetic acid, propionic acid, acrylic acid, methacrylic acid, maleic acid, iraconic acid, p-toluenesulfonic acid and benzenesulfonic acid.

The enzymatic degradation of starch is carried out at from 30 to 120° C., while the hydrolytic degradation of the starch is effected at from 50 to 150° C. From about 5 minutes to 10 hours are required for the hydrolytic degradation, the degree of hydrolytic degradation of the starch depending on the selected temperature, the pH and the time.

In the graft polymerization, the temperatures are usually from 40 to 180° C., preferably from 60 to 150° C. As soon as the temperature in the polymerization is above the boiling points of the inert diluent or solvent or of the monomers A, the polymerization is carried out under Pressure. The concentration of the components A and B1 or B2 in the polymerization in the presence of inert solvents or inert diluents is from 10 to 80, preferably from 20 to 70% by weight.

The graft polymers can be prepared in the conventional polymerization apparatuses. For example, stirred kettles which are equipped with anchor, paddle or impeller stirrers or multistage impulse counter-current agitators are used for this purpose. Particularly in the graft polymerization in the absence of diluents, it may be advantageous to carry out the polymerization in a kneader. It may also be necessary to effect polymerization in a kneader if the procedure is carried out at high concentrations or if the natural substances have high molecular weights and initially swell considerably.

The components A and B1 or B2 are used in a weight ratio of from 1:99 to18:82, preferably from 2:98 to 10:90.

The aqueous graft polymer solutions or dispersion obtained according to the process of the present invention may be directly applied as tanning agents of the production of leather and skins. However, they may also contain further additives and also may be with or without further additives be dried, for instance by spray drying.

Further additives may be added into the liquid before drying or blend in after drying. All the compounds customly used in leather processing can be added. Typically including the following: inorganic fillers such as china clay, kaolin of other similar alum-silcates; organic compounds such as (poly)saccharides and polypeptides mentioned above, lignin and its derivatives, vegetable tannings, amino-resins and synthetic tannins; Salts with tanning function such as aluminium oxide or chromium oxide; silicon oxide and derivatives such as silica and water glass; fatty materials, natural or synthetic, solubilised using any suitable functional groups.

The graft polymers which can be prepared by the above mentioned processes are colorless to brownish products. In the case of polymerization in an aqueous medium, they are in the form of dispersions or polymer solutions. Depending on the particular composition or concentration of the graft polymers, the products are low-viscosity to pasty aqueous solutions or dispersions. Owing to the content of natural substances, the graft polymers described above are more readily biodegradable than the polymers used to date and based on ethylenically unsaturated monomers but can at least be eliminated from the wastewater of wastewater treatment plants with the sewage sludge.

The aqueous graft polymer solutions thus obtainable are very suitable as tanning agents for the production of leather and skins.

Thus, the graft polymers used according to the invention can be employed for the selftanning and pretanning of pelts and skins in aqueous liquor. Graft polymers which are composed of acrylic acid or salts thereof alone or of a monomer mixture A of acrylic acid or salts (a) thereof and monomers (b) with at least 80%, particular at least 98% by weight of (a) are particularly advantageously used for these applications.

Another object of the invention relates to a process for the self-tanning, pretanning or assist tanning of leather pelts or skin pelts or for the retanning of leather or skins, which comprises treating said leather pelts or skin pelts with tanning agents of graft polymers according to the present invention.

In the self-tanning and pretanning of pelts and skins, advantageously the pickled pelts, for example cattle hides having a split thickness of from 1.5 to 4 nun, or skins, for example sheepskins, are treated, at a pH of from 2 to 7, in particular from 2.5 to 4.5, and at from 15 to 40° C., in particular from 20 to 35° C., in the course of from 3 to 20 hours, with an aqueous solution of the graft polymers used according to the invention. The treatment is carried out, for example, by drumming. The required amount of graft polymers used according to the invention is usually from 2 to 30, in particular from 5 to 25, % by weight, based on the pelt weight. The liquor ratio, i.e. the percentage weight ratio of the treatment liquor to the goods, is usually from 30 to 200% in the case of pelts and from 100 to 2000% in the case of skins, based in each case on the pelt weight.

After the treatment is complete, the leather or skin is usually brought to a pH of from 2 to 8, in particular from 3 to 5, for example magnesium oxide, sodium carbonate, sodium bicarbonate or an organic acid, such as formic acid, or a salt thereof, being used for this purpose, and if necessary is treated with further tanning agents and, if desired, is dyed or fatliquored toward the end of the tanning process or thereafter.

Furthermore, the graft polymers used according to the invention can be employed for simultaneous tanning of pelts and skins, together with the tanning agents for the main tanning, which may be, for example, chrome tanning or aluminium tanning or organic tanning for example using aldehydes, phophonium salts or optionally capped isocyanates. In this case, the working conditions with regard to pH, temperature and duration of treatment are adjusted to the requirements of the main components of the tanning process, and the same applies to the treatment apparatus and the liquor ratio and to the aftertreatment. The required amount of graft polymers used according to the invention is usually from 0.1 to 20, in particular from 0.5 to 15, % by weight, based on the pelt weight.

Furthermore, the graft polymers used according to the invention can be employed for retanning tanned leather and skin, for example chrome leather or wet white, in an aqueous liquor. In the procedure usually adopted here, the pickled pelts and skins, for example cattle hides having split thicknesses of from 1.25 to 4 mm, are tanned with, for example, a conventional chromium-containing tanning agent, such as a chromium(III) salt, e.g. chromium(III) sulfate, in a conventional manner, and the resulting pretanned skins (wet blues in the case of chrome tanning) are neutralized and are treated at a pH of from 2 to 7, in particular from 2.5 to 6, and at from 15 to 60° C., in particular from 25 to 45° C., in the course of from 1 to 12 hours, with an aqueous solution of the graft polymers used according to the invention.

This treatment is carried out, for example, by drumming. The required amount of graft polymers used according to the invention is usually from 2 to 30, in particular from 5 to 25, % by weight, based on the shaved weight of the leather. The liquor ratio is usually from 30 to 200% in the case of pelts and from 100 to 2000% in the ease of skins, based in each case on the shaved weight of the leather.

After and, if necessary, also before the treatment, the leather or skin is usually brought to a pH of from 3 to 5, for example magnesium oxide or an organic acid, such as formic acid, or a salt thereof being used for this purpose, and, if desired, is dyed and fatliquored toward the end of the treatment or thereafter.

The leather or skin retanned in this manner may have been treated, before retanning with the graft polymers used according to the invention, additionally with other tanning agents, such as other polymer tanning agents or syntans. Furthermore, said graft polymers may be used simultaneously with such additional tanning agents, for example in the main tanning process.

Suitable additional or simultaneously used tanning agents are all conventional agents having a tanning effect on pelts and skins. A comprehensive treatment of such tanning agents is to be found, for example, in Ullmanns Encyklopadie der technisehen Chemie, 3rd Edition, Volume 11, pages 585 to 612 (1960). Individual classes of tanning agents which may be mentioned are the mineral tanning agents, for example chromium, aluminium, titanium and zirconium salts, or organic tanning for example using aldehydes, phophonium salts or optionally capped isocyanates, the synthetic tanning agents, such as the abovementioned polymer tanning agents and syntans, and the vegetable tanning agents.

The leathers and skins which in particular are pretanned with a chrome tanning agent and an organic organic tanning agent and produced using the graft polymers used according to the invention have extremely high lightfastness and heat resistance and good body and softness and are tight-grained.

In addition, the graft polymers used according to the invention produce only slight lightening of the color, if any at all. Leathers and skins which have been produced with the graft polymers used according to the invention by self-tanning or, for example, by retanning of chrome leather are therefore very intensely and uniformly colored.

A particular advantage of the graft polymers used according to the invention is that, in contrast to conventional syntans, they can contain no unsulfonated phenols as residual monomers, which constitute a health hazard, and, in contrast to conventional polymer tanning agents, are more readily biodegradable owing to the incorporation of natural substances, i.e. the components B1 or B2, but at least can be better eliminated from the wastewater of wastewater treatment plants together with the sewage sludge.

Another object of the present invention is a graft polymer of polysaccharides and polypeptides or its respective derivatives, obtainable by free radical polymerization of
A) a monomer selected from or a monomer mixture of
  (a) from 20 to 100% by weight of acrylic acid or methaciylic acid or of a mixture thereof
    or of the alkali metal, alkaline earth metal or ammonium salis thereof;
  (b) from 0 to 80% by weight of other monoethylenically unsaturated monomers which are copolymerizable with the monomers (a) and
  (c) from 0 to 5% by weight of monomers having at least 2 ethylenically unsaturated, nonconjugated double Bonds in the molecule,
in the presence of
B1) polysaccharides, oxidatively, hydrolytically or enzymatically degraded polysaccharides, oxidized hydrolytically degraded or oxidized enzymatically degraded polysaccharides, or such chemically modified degraded products, chemically modified mono-, oligo-or polysaccharides or mixtures of the stated compounds and
B2) polypeptides, their hydrolyrically or encymatically and optionally chemically modified degraded polypeptides or mixtures of the stated compounds
in a weight ratio A: (B1+B2) of from 60:40 to 1:99, and B1:B2 of from 97:3 to 3:97, preferably 97:3 to 70:30 or in the range of 30:70 to 5:95.

With respect to the further definition of the monomers A, B1 and B2 the above mentioned embodiments shall also apply here in the same way.

In a preferred embodiment the ratio of B1 and B2 shall be 97:3 to70:30 preferably where B1 is selected from starch hydrolysate with molecular weight range 500-5000 and preferably B2 is selected from polypeptide with average molecular weight higher than 3000 and preferably higher than 5000. The ratio of B1 and B2 could also be preferred at 30:70 to 5:95 preferably where B1 is selected from starch hydrolysate with molecular weight range 3000-10000 while B2 is preferably selected from polypeptide with average molecular weight higher than 3000. In both cases there are two preferred A:(B1+B2) range 60:40 to 40:60 and 20:80 to 3:97 which may be used for different applications.

The preferred process for the manufacturing of graft polymers according to the present invention wherein the component B1 and B2 is used as core, is by free radical induced copolymerisation wherein the components of the monomers of A) are added to B 1) and B2) in an inert solvent at a temperature of 40 to 180° C. in the presence of a free radical-forming initiator, characterized in that less than 10% of the free radical-forming initiator is with the component B1) and B1 before the addition of the monomers A) and the rest is added together with the monomers of A).

Preferably the initiator is added to the reaction mixture together with monomers of A). For other processing details, above mentioned embodiments shall also apply here in the same way.

EXAMPLES

For all the chemical synthesis, glass reactor with heating/cooling capacity has been used. The reactor was equipped with stirrer, a reflux condenser, thermometer, nitrogen in-let and feed in-lets. All raw materials were weight to accuracy of +/−1%. Continuous addition of reagents was effected using pumps. All the leather making trial was carried out using rotating drum in usual manner.

Example 1

400 grams of 30% by weight (in water) starch hydrolysate with average molecular weight 2400 gram/mole was introduced into 1 liter reactor. After purging for 30 minutes with nitrogen, 3 grams of ammonium cerium nitrate (dissolved in 30 ml of 1 n nitric acid) was introduced. The content of the react was heated to 30° C. under stirring for 1 hour. 16 grams of acrylic acid and 30 grams of distilled water were metered into the reactor over 6 hours (uniformly) at 30° C. under stirring. Then 0.1 grams of sodium persulphate dissolved in 2 ml of distilled water was added into the reactor and the content of the reactor was heated to 90-92° C. under stirring, and the content of the reactor was then allowed to react for 2 hours. At the end of reaction, the content of the reactor was cooled to 40° C. and 15 grams of 50% sodium hydroxide solution was added slowly under stirring making sure the temperature in reactor below 45° C. The final product was obtained by allowing the reactor to cool to room temperature under stirring.

Example 2

400 grams of 40 by weight % (in water) starch hydrolysate with average molecular weight 3000 g/mole was introduced into I liter reactor. The content of the react was heated to 88-92° C. under stirring with nitrogen purging, 1.5 grams ammonium persulphate dissolved in 10 ml of distilled water was added and 5 minutes later 15.5 grams of acrylic acid and were metered into the reactor over 4 hours (uniformly). After curing for 1 hour, 0.02 grams of ammonium persulphate dissolved in 2 ml of distilled water was added into the reactor and the content of the reactor was kept at 88-92° C. under stirring, and the content of the reactor was then allowed to react for 1 further hour. At the end of reaction, the content of the reactor was cooled to 40° C. and 30% sodium hydroxide solution was added slowly under stirring making sure the temperature in reactor below 60° C. until pH reaches 5-6. The final product was obtained by allowing the reactor to cool to room temperature under stirring and biocides were added and mixed well.

Example 3

400 grams of 38% by weight (in water) protein hydrolysate from animal source with average molecular weight 7400 g/mole was introduced into 1 liter reactor. The content of the react was heated to 88-92° C. under stirring with nitrogen purging. 1.35 grams ammonium persulphate dissolved in 10 ml of distilled water was added and 5 minutes later 14.8 grams of acrylic acid and were metered into the reactor over 4 hours (uniformly). After curing for 1 hour, 0.02 grams of ammonium persulphate dissolved in 2 ml of distilled water was added into the reactor and the content of the reactor was kept at 88-92° C. under stirring, and the content of the reactor was then allowed to react for 1 further hour. At the end of reaction, the content of the reactor was cooled to 40° C. and 30% sodium hydroxide solution was added slowly under stirring making sure the temperature in reactor below 60° C. until pH reaches 5-6. The final product was obtained by allowing the reactor to cool to room temperature under stirring and biocides were added and mixed well.

Example 4

300 grams of 40% by weight (in water) protein hydrolysate with average molecular weight 3100 gram/mole and 150 grams of 40% by weight (in water) starch hydrolysate with average molecular weight 3300 g/mole was introduced into 1 liter reactor. The content of the react was heated to 88-92° C. under stirring with nitrogen purging. 1.5 grams ammonium persulphate dissolved in 10 ml of distilled water was added and 5 minutes later 17 grams of acrylic acid and were metered into the reactor over 2 hours (uniformly). After curing for 1 hour, 0.05 grams of ammonium persulphate dissolved in 2 ml of distilled water was added into the reactor and the content of the reactor was kept at 88-92° C. under stirring, and the content of the reactor was then allowed to react for 1 further hour. At the end of reaction, the content of the reactor was cooled to 40° C. and 30% sodium hydroxide solution was added slowly under stirring making sure the temperature in reactor below 60° C. until pH reaches 5-6. The final product was obtained by allowing the reactor to cool to room temperature under stirring and biocides were added and mixed well.

The compound powder product: 170 grams of kaolin and 180 grams of sodium lignosulphonate and 300 nil of water was mixed well with the above product. The powder product was obtained by spray drying of the mixture.

Example 5

15 grams protein from vegetable source and 400 grams of 35% by weight (in water) starch hydrolysate with average molecular weight 3000 g/mole was introduced into 1 liter reactor. The content of the react was heated to 88-92° C. under stirring with nitrogen purging. 1.5 grams ammonium persulphate dissolved in 10 ml of distilled water was added and 5 minutes later 14.8 grams of acrylic acid and were metered into the reactor over 4 hours (uniformly). After curing for 1 hour, 0.02 grams of ammonium persulphate dissolved in 2 ml of distilled water was added into the reactor and the content of the reactor was kept at 88-92° C. under stirring, and the content of the reactor was then allowed to react for 1 further hour. At the end of reaction, the content of the reactor was cooled to 40° C. and 30% sodium hydroxide solution was added slowly under stirring making sure the temperature in reactor below 60° C. until pH reaches 5-6. The final product was obtained by allowing the reactor to cool to room temperature under stirring and biocides were added and mixed well.

Example 6

300 grams of 20% aqueous solution (by weight) of starch hydrolysate with average molecular weight 1200-1400 gram/mol and 6 grams native protein from vegetable source was introduced into 1 liter reactor. The content of the react was heated to 88-92° C. under stirring with nitrogen purging. 60 grams of acrylic acid and 2.25 grams sodium persulphate dissolved in 20 ml of distilled water were metered into the reactor over 3 hours (uniformly). After curing for 1 hour, 0.05 grams of sodium persulphate dissolved in 2 ml of distilled water was added into the reactor and the content of the reactor was kept at 88-92° C. under stirring, and the content of the reactor was then allowed to react for 1 further hour. At the end of reaction, the content of the reactor was cooled to 40° C. and 30% sodium hydroxide solution was added slowly under stirring making sure the temperature in reactor below 60° C. until pH reaches 6-7. The final product was obtained by allowing the reactor to cool to room temperature under stirring and biocides were added and mixed well.

Example 7

300 grams of 25% (W/W in water) protein hydrolysate with average molecular weight 4200 gram/mole and 15 grams native starch from vegetable source was introduced into 1 liter reactor. The content of the react was heated to 88-92° C. under stirring with nitrogen purging. 72 grams of acrylic acid and 2,5 grams sodium persulphate dissolved in 40 ml of distilled water were metered into the reactor over 3 hours (uniformly). After curing for 1 hour, 0.05 grams of sodium persulphate dissolved in 2 ml of distilled water was added into the reactor and the content of the reactor was kept at 88-92° C. under stirring, and the content of the reactor was then allowed to react for 1 further hour. At the end of reaction, the content of the reactor was cooled to 40° C. and 30% sodium hydroxide solution was added slowly under stirring making sure the temperature in reactor below 60° C. until pH reaches 6-7. The final product was obtained by allowing the reactor to cool to room temperature under stirring and suitable biocides were added and mixed well.

COMPARATIVE EXAMPLES

Compare sample 1 was made following the example 5 of U.S. Pat. No. 5,714,560 (protein core and about 60% acrylic acid).

Compare sample 2 was made following the example 1 of U.S. Pat. No. 5,425,784 (sugar core and about 40% acrylic acid and 14% maleic anhydride).

Compare sample 3 was made by a physical mixture of comparison sample 1 and comparison sample 2.

Compare sample 4 is a commercial condensation product of a sulfonated phenol and formaldehyde.

Application Example 1

A bovine wet blue, shaved to 1.6 mm, was trimed so that the official test part was left. The piece was divided into four parts in middle and along backline to give a fair comparison. After rinse in a conventional manner, the wet blue was neutralised to pH5.5-5.7 in 100% liquor with a mixture of sodium formate and sodium carbonate. After drain and rinsing with water at 45° C., 100% water at 45° C. was added, 1% of brown dye was added. After running for 25 minutes, 3% of products of the respective tanning agents (present invention vs. comparison, see table) (at solid base) was added after mixing with 15% of water, The retanning time was 50 minutes. The leather was then fatliquored with 5% commercial fatliquor for 60 minutes and acidification to pH 3.6-3.8 were done in a conventional way using commercially available products. The drying and subsequent mechanical operations were also carried in a conventional manner.

The leather was assessed subjectively and the results show that agent from this invention is different and superior to the comparative samples.

Assessment Results
(in 1-5 arbitrary scale, 1=poor, 2=fair, 3=good, 4=very good, and 5=exceptional)

| Items tested | Example 6 of this invention | Comparative sample 1 | Comparative sample 2 | Comparative sample 3 |
|---|---|---|---|---|
| Surface dyeing shade | 4 | 3 | 2.5 | 2 |
| Fullness | 4 | 2 | 3.5 | 2 |
| Softness | 3 | 2 | 2 | 2 |
| Grain tightening | 4 | 4 | 2 | 2 |
| Aesthetical assessment | Full and nice handle | Harsh grain and poor handle | Reasonably full and acceptable handle | Poor handle |

Conclusion: The present invention shows with respect to the combination of polysaccharide and polypeptide an unexpected improvement over the prior art tanning agents with pure saccharide or polypeptide based graft polymers respectively and even a better result over the physical mixture of both. Examples 4, 5 and 7 show as well as good results.

Application Example 2

A bovine wet blue, shaved to 1.6 mm, was trimed so that the official test part was left. The piece was divided into four parts in middle and along backline to give a fair comparison. After rinse in a conventional manner, the wet blue was neutralised to pH 5.5-5.7 in 100% liquor with a mixture of sodium formate and sodium carbonate. After drain and rinsing with water at 45° C., 100% water at 45° C. was added, 1% of brown dye was added. After running for 25 minutes, 8% of products (at solid base on wetblue eight) (present invention vs. comparison, see table) was added after mixing with 15% of water. The retanning time was 50 minutes. The leather was then fatliquored with 5% commercial fatliquor for 60 minutes and acidification to pH 3.6-3.8 were done in a conventional way using commercially available products. The drying and subsequent mechanical operations were also carried in a conventional manner.

The leather was assessed subjectively and the results show that agent from this invention behaves like a traditional syntan while compare sample 1 and 2 still behave like a acrylic resin.

Assessment Results
(in 1-5 arbitrary scale, 1=poor, 2=fair,3=good, 4=very good, and 5=exceptional)

| Items | Example 5 of this invention | Comparative sample 2 | Example 2 of this invention | Comparative sample 4 |
|---|---|---|---|---|
| Surface dyeing shade | 4 | 2 | 3 | 3 |
| fullness | 3.5 | 2.5 | 4 | 4 |
| softness | 3.5 | 2.5 | 3.5 | 3 |
| Grain tightening | 3 | 2 | 3 | 2.5 |
| Aesthetical assessment | Full, supple leather with pleasing handle | Rubbery "synthetic" type of handle | Full, supple leather with pleasing handle | Full and supple leather |

Conclusion: The present invention shows that when the acrylic portion (A component) in the graft polymer is low, the graft polymer performs similar to conventional phneolic based syntan. Here the combined protein-polysaccharide approach also show advantages. In addition an improvement can be shown over comparison examples with higher acrylic amounts (see Example 5 vs. comparison example 2; Example 2 vs. comparison example 2).

Application Example 3

A bovine wet blue, shaved to 1.6 mm, was trimed so that the official test part was left. The piece was divided into four parts in middle and along backline to give a fair comparison. After rinse in a conventional manner, the wet blue was neutralised to p1-15.5-5.7 in 100% liquor with a mixture of sodium formate and sodium carbonate. After drain and rinsing with water at 45° C., 100% water at 45° C. was added, 1% of brown dye was added. After running for 25 minutes, 8% of products (at solid base) (present invention vs. comparison, see table) was added after mixing with 15% of water. The retanning time was 50 minutes. The leather was then fatliquored with 5% commercial fatliquor for 60 minutes and acidification to pH 3.6-3.8 were done in a conventional way using commercially available products. The drying and subsequent mechanical operations were also carried in a conventional manner.

The leather was assessed subjectively and the results show that agent from this invention behaves like a traditional syntan while compare sample 1 and 2 still behave like a acrylic resin.

Assessment Results
(in 1-5 arbitrary scale, 1=poor, 2=fair,3=good, 4=very good, and 5=exceptional)

| Items | Example 4 of this invention | Comparative sample 1 | Example 3 of this invention | Comparative sample 4 |
|---|---|---|---|---|
| Surface dyeing shade | 3.5 | 3 | 4 | 3 |
| fullness | 3.5 | 2 | 3 | 4 |
| softness | 3 | 1.5 | 2.5 | 3 |
| Grain tightening | 3 | 3 | 4 | 2.5 |
| Aesthetical assessment | Full, supple leather with pleasing handle | Papery and rubbery | Full, supple leather with pleasing handle | Full and supple leather |

Conclusion: The present invention shows that when the acrylic portion (A component) in the graft polymer is low, the graft polymer performs similar to conventional syntan. Here the combined protein-polysaccharide approach also show advantages. In addition an improvement can be shown over comparison examples with higher acrylic amounts (see Example 4 vs. comparison example 1; Example 3 vs. comparison example 1).

Application Example 4

A bovine wet blue, shaved to 1.6 mm, was divided into two mirrored parts along backline to give a fair comparison. The two pieces was processed in twinned drums to reduce possible variations and the following process was used. After rinse in a conventional manner, the wet blue was neutralised to pH5.0-5.2 in 100% liquor with a mixture of sodium formate and sodium carbonate. After drain and rinsing with water at 45° C., 100% water at 45° C. was added, for sample 6% of product from example 6 was used for retanning while the retanning of reference piece was effected by using 6% medium molecular weight poly acrylic acid, sodium salt (30% solid content) (commercial product). The retanning time was 90 minutes. After drain and rinse with water at 50° C., dyeing by 3% commercial leather dye, fatliquoring with 6% commercial fatliquor and acidification to pH 3.6-3.8 were done in a conventional way using commercially available products. The mechanical operation and drying were also carried in a conventional manner.

The results shown that compared with reference, leather made by using our sample is tighter, fuller and mellower.

Examples 1-5 and 7 show as well as good results.

Application Example 5

The limed pelt was delimed and bated by using traditional procedure (ammonium Deliming and mixed bating agent) and washed and drained well using a standard rotating tanning drum. 40% of water (based on the weight of limed pelt, all the percentage weights in this example are the same based on the limed pelt weight) was added followed by 8% of common salt (sodium chloride). After rotating for 5 minutes to dissolve salt, 0.5% of formic acid (diluted with water 1:5) and 0.9% of sulphuric acid (dilute in water 1:10) was added. Run for 120 minutes and pH was between 2.9-3.1. 4% of product made in example 3 was added and the drum was rotated for further 90 minutes. Then 6.0% of chrome tanning agent (typically 25% chrome oxide and basicity 33%) was added and drum was rotated for 120 minutes. 0.45% of finely powdered magnesium oxide was added and drum was rotated for further 9 hours. The final pH was about 3.9 and final temperature was about 42° C. After draining the float the tanned leather was briefly rinsed with 200% cold water.

As reference, the same process was run without sample from example 3.

The result shows that the addition of product from example 3 has increased chrome oxide up-take by leather and better handle and more uniform wet blue was obtained. Examples 1, 2 and 4 to 7 show as well as good results.

Application Example 6

A bovine wet blue, shaved to 1.6 mm, was divided into two mirrored parts along backline to give a fair comparison. The two pieces was processed in twinned drums to reduce possible variations and the following process was used. After rinse in a conventional manner, the wet blue was neutralised to pH 5.0-5.2 in 100% liquor with a mixture of sodium formate and sodium carbonate. After drain and rinsing with water at 45° C., 100% water at 45° C. was added, for sample 4% of product from example 4 and 4% of product from sample 5 was used for retanning while the retanning of reference piece was effected by using 6% spray-dried PSA-urea-phenol-formaldehyde condensate (commercial product). The retanning time was 90 minutes. After drain and rinse with water at 50° C., dyeing by 3% commercial leather dye, fatliquoring with 6% commercial fatliquor and acidification to pH 3.6-3.8 were done in a conventional way using commercially available products. The mechanical operation and drying were also carried in a conventional manner.

The assessment of resultant leather showed that leather retanned using our environmental friendly synthetic tanning agent from examples 4 and 5 respectively has better surface dyeing shade, more level and the handle is comparable to those of leather retanned using traditional synthetic tanning agent. This example also highlights another advantage of this invention—the products of this invention may contain less salt (i.e. virtually salt free for low portion A products) therefore it is more effective than the conventional syntan on solid base. Here 8% total of 45% solid content liquid will give a total solid about 4% and it is as effective as 6% of solid conventional syntan.

Application Example 7

A bovine wet blue, shaved to 1.6 mm, was used. After rinse in a conventional manner, the wet blue was neutralised to pH 5.0-5.2 in 100% liquor with 4.5% of example 3, 2% commercial neutralising agent and a mixture sodium acetate and sodium bicarbonate. After drain and rinsing with water at 35° C., 60% water at 35° C. was added, 3% of a commercial polymeric retanning agent, 4% of example 6 and 2% commercial penetrating fatliquor (all diluted in warm water 1:3) were added. After running for 20 minutes 3% of leather dyestuff and 3% commercial amino-resin as added. After running for 20 minutes, 12% of example 2 was added. After running for another 20minutes, 1% leather top dyestuff and 2% fatliquor was added. After running for 60 minutes, the system as acidified to pH 4-4.2 by using formic acid. After drain and rinse with water at 55° C., fatliquoring with 10% commercial fatliquor and acidification to pH 3.6-3.8 were done in a conventional way using commercially available products. The mechanical operation and drying were also carried in a conventional manner.

The assessment of resultant leather showed that leather retanned using our environmental friendly synthetic tanning agents in combination with currently available commercial products has full dye penetration and deep and level surface dyeing shade. The tighten grain, supple bady and appealing handle make it suitable for the specified commercial requirements with desired edges.

Comparative Example 5

Example 2 of US2008/0229511 (sodium alginate having an average molecular weight of about 100.000 and protein hydrolysate core and about 88.9% acrylic acid) was repeated and tested in the application examples 8.

Application Example 8

A bovine wet blue, shaved to 1.5 mm, was trimmed so that the official test part was left. The piece was divided into four parts in middle and along backline to give a fair comparison. After rinse in a conventional manner, the wet blue was neutralised to pH5.0-5.4 in 100% liquor with a mixture of sodium formate and sodium carbonate. After drain and rinsing with water at 45° C., 100% water at 45° C. was added, 3% of products of comparative example 5 (at solid base on wetblue weight) were added after mixing with 15% of water. After running for 60 minutes, 2% of black leather dye was added. The dyeing time was 60 minutes. The leather was then fatliquored with 5% commercial fatliquor for 60 minutes and acidification to pH 3.4-3.8 was done in a conventional way using commercially available products. The drying and subsequent mechanical operations were also carried in a conventional manner.

The leather was assessed subjectively and the results show that agents from this invention produced satisfactory leather while the comparative sample 5 formed coating-like surface layer and blocked the penetration/fixation of dyestuff and fatliquor resulting in very poor leather.

Assessment Results (in 1-5 arbitrary scale, 1=poor, 2=fair, 3=good, 4=very good, and 5=exceptional)

| Items | Example 4 of this invention | Additional Comparative sample 5 | Example 6 of this invention |
|---|---|---|---|
| Surface dyeing shade | 5 | 1 | 4 |
| fullness | 4 | 4 | 4 |
| softness | 4 | 1 | 3 |
| Grain tightening | 3 | 2 | 4 |
| Aesthetical assessment | Soft leather with pleasing handle | Hard and dead leather with very light surface shade. | Full, supple leather with good handle |

The invention claimed is:

1. A tanning agent comprising a graft polymer obtained by free radical polymerization of:
   A) a monomer or a monomer mixture comprising:
      (a) 20 to 100% by weight of acrylic acid, or methacrylic sold, or alkali metal, alkaline earth metal, or ammonium salts of acrylic add, or alkali metal, alkaline earth metal, or ammonium salts of methacrylic acid, or a mixture thereof;
      (b) 0 to 80% by weight of other moncethylenically unsaturated monomers which are copolymerizable with the monomer (a); and
      (c) 0 to 5% by weight of monomers having at least 2 ethylenically unsaturated, nonconjugated double bonds in the molecule,
   in the presence of a mixture of both:
      B1) oxidatively, hydrolytically or enzymatically degraded polysaccharides, oxidized hydroiytically degraded or oxidized enzymatically degraded polysaccharides, or chemically modified degraded products, chemically modified mono-, oligo-or polysaccharides or mixtures of the stated compounds, wherein the polysaccharides have an average molecular weight of 500-10,000 Dalton, and
      B2) hydrolytically or enzymatically degraded polypeptides, or chemically modified polypeptides, or mixtures of the stated compounds, wherein the polypeptides have an average molecular weight greater than 1,500 Dalton,
   and having a weight ratio A:(B1+B2) of (1 to <45):(99 to >55), and a weight ratio of B1:B2 of 97:3 to 3:97.

2. The tanning agent according to claim 1, wherein:
   the polysaccharides are oxidatively, hydrolytically or enzymatically degraded polysaccharides having an average molecular weight of 500 to 5,000 Dalton;
   the polypeptides, hydrolytically or enzymatically degraded, and optionally chemically modified polypeptides have an average molecular weight greater than 5000; and
   a weight ratio of B1:B2 of 97:3 to 70:30, or 30:70 to 5:95.

3. The tanning agent according to claim 1, wherein the polysaccharides are hydrolyticaliy degraded starch having an average molecular weight of 3,000 to 8,000 Dalton.

4. The tanning agent according to claim 1, wherein the weight ratio A:(B1+B2) is (1 to 44.5):(99 to 55.5).

5. The tanning agent according to claim 1, wherein the weight ratio of A:(B1+B2) is (1 to 40):(99 to 60).

6. Process for the manufacturing of graft polymers according to claim 1 by free radical induced co-polymerization, the process comprising adding the components of the monomers of A) to B1) and B2) in an inert solvent at a temperature of 40 to 150° C. in the presence of a free radical-forming initiator, wherein less than 10% of the free radical forming initiator is with the component B1) and B2) before the addition of the monomers A), and a remaining portion of the radical-forming initiator is added together with the monomers of A).

7. A process for the self-tanning, pretanning or assist tanning of leather pelts or skin pelts, or for the retanning of leather or skins, the process comprising treating leather pelts or skin pelts with tanning agents of graft polymers according to claim 1.

8. Leather, self-tanned, pretanned, assisted tanned or returned, with a tanning agent according to claim 1.

9. A tanning agent comprising a graft polymer obtained by free radical polymerization of:
   A) a monomer or a monomer mixture comprising:
      (a) 20 to 100% by weight of acrylic acid, or methacrylic acid, or alkali metal, alkaline earth metal, or ammonium salts of acrylic acid, or alkali metal, alkaline earth metal, or ammonium salts of methacrylic acid, or a mixture thereof;
   in the presence of a mixture of both:
      B1) oxidatively, hydrolytically or enzymatically degraded polysaccharides, oxidized hydrolytically degraded or oxidized enzymatically degraded polysaccharides, or chemically modified degraded products, chemically modified mono-, oligo-or polysaccharides or mixtures of the stated compounds, and
      B2) hydrolytically or enzymatically degraded polypeptides, or chemically modified polypeptides, or mixtures of the stated compounds,
   wherein:
   a weight ratio A:(B1+B2) is (1 to 60):(99 to 40), and
   a weight ratio of B1:B2 is (97-3):(3-97).

10. The tanning agent according to claim 9, wherein:
    the weight ratio of B1:B2 is (97-70):(3-30); and
    the weight ratio A:(B1+B2) is (60-40):(40-60) and (20-3):(80-97).

11. The tanning agent according to claim 10, wherein:
    B1 is selected from starch hydrolysates with molecular weights of 500-5000; and
    B2 is selected from polypeptides with an average molecular weight higher than 3000.

12. The tanning agent according to claim 9, wherein:
    the weight ratio of B1;B2 is (30-5):(70-95); and
    the weight ratio A:(B1+B2) is (60-40):(40-80) and (20-3):(80-97).

13. The tanning agent according to claim 12, wherein:
    B1 is selected from starch hydrolysates with molecular weights of 3000-10000; and
    B2 is selected from polypeptides with an average molecular weight higher than 3000.

* * * * *